Jan. 6, 1948.   H. GOLDBERG   2,434,069
ELECTRONICALLY REGULATED POWER SUPPLY
Filed Feb. 7, 1944
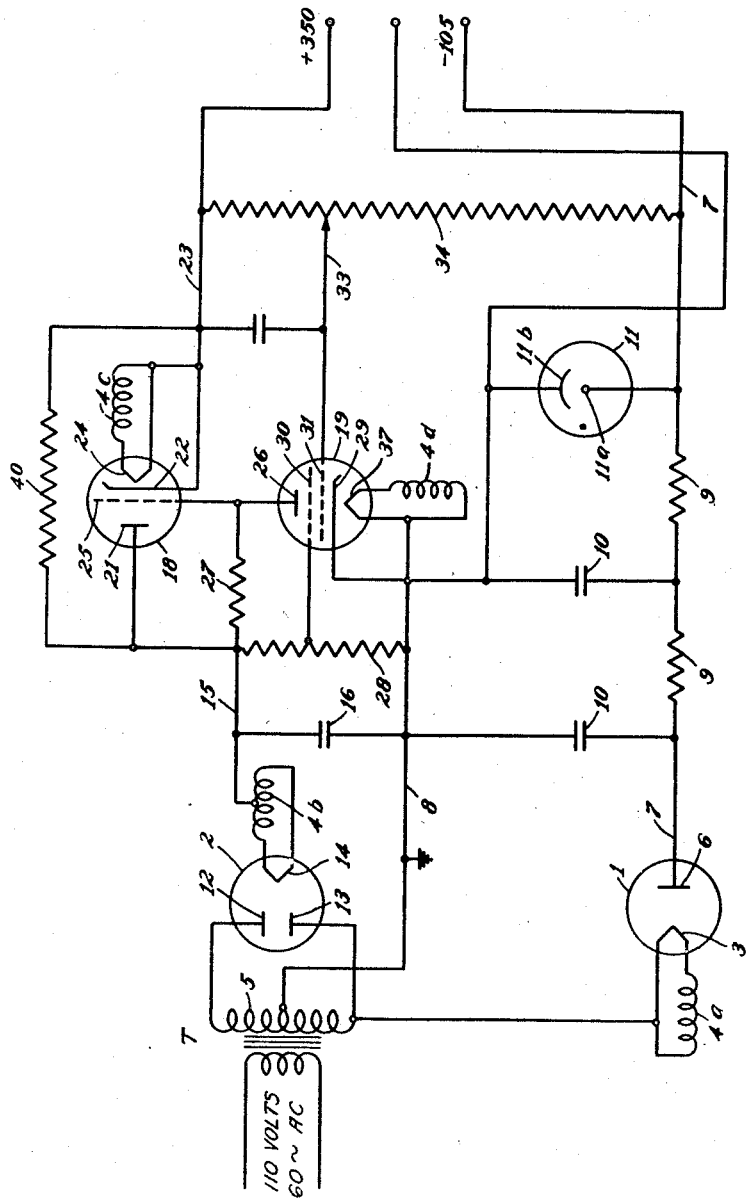
INVENTOR.
HAROLD GOLDBERG
BY
D. Clyde Jones
ATTORNEY Patented Jan. 6, 1948

2,434,069

UNITED STATES PATENT OFFICE 2,434,069

ELECTRONICALLY REGULATED POWER SUPPLY

Harold Goldberg, Irondequoit, N. Y., assignor to Stromberg-Carlson Company, Rochester, N. Y., a corporation of New York Application February 7, 1944, Serial No. 521,457

7 Claims. (Cl. 175—363)

This invention relates to an electronically regulated power supply unit.

In the operation of various devices and particularly in the operation of electronic devices, such as those employing cathode ray tubes, it is essential to provide therefor uniform voltages, both positive and negative, with respect to ground.

The present invention has as its main feature the provision of a regulated power supply network which will afford improved performance with a reduced number of circuit components, as compared with known devices.

Another feature of the invention relates to a power supplying arrangement in which an electronically regulated negative power source is used as a reference voltage for an electronically regulated positive power supply.

In the drawing which diagrammatically represents the power supply network of the present invention, there is disclosed a combined half wave rectifier section with its rectifier tube 1 and a full wave rectifier section with its rectifier tube 2. These rectifier sections include an iron core transformer T, the primary winding of which is connected across a commercial source such as sixty cycle, one hundred ten volt alternating current.

The half wave rectifier tube 1 has its cathode 3 heated by current induced in transformer winding 4a which is connected to the lower terminal of the main secondary winding 5 of the transformer. The anode 6 of tube 1 is connected to conductor 7 which functions with the grounded conductor 8, as the output of the half wave rectifier. These conductors lead to a filter comprising the series resistors 9, 9 and the parallel-connected capacitors 10, 10. A diode tube 11 filled with a gas, such as neon or argon (of the type now referred to as VR75 and VR105 tubes) has its cathode 11a and anode 11b respectively connected to the conductors 7 and 8. Since this gas tube breaks down when subjected to a predetermined voltage for which it is designed, it functions both as an exact electronic regulator for the half wave rectifier and also serves as an invariable reference potential for the electronically regulated positive power-supplying full wave rectifier section which will now be described.

The full wave rectifier section includes the main secondary winding 5 of the transformer which winding has its end terminals respectively connected to the anodes 12 and 13 of the full wave rectifier tube 2 provided with a filament or cathode 14. This filament is heated, during use, by current induced in another winding 4b on the transformer T. A conductor 15 connected to a midpoint on winding 4b and the grounded conductor 8 connected to the midpoint of transformer winding 5, constitute the output of this rectifier tube. A condenser 16 connected between these conductors serves to filter out a portion of the ripple component of the rectified current. The current output of the full wave rectifier is electronically controlled by an electron discharge device such as the triode 18 and another electron discharge device such as the tetrode 19, connected as shown, the conductor 15 being directly connected to anode 21 of tube 18 while the cathode 22 of this tube is connected to one outlet lead 23 of the power supply device. The filament heater 24 of this cathode is supplied with heating current from a secondary winding of the transformer T, as indicated by the winding 4c. The flow of current through this triode is controlled by the voltage applied to the grid 25 thereof, as will be described. The tetrode 19 has its anode 26 directly connected to the grid 25 and through resistor 27 to the conductor 15. A voltage dividing resistor 28 is connected at one end to conductor 15 and is connected at its other end to grounded conductor 8, which in turn is connected to the cathode 29 of tube 19. An intermediate point on resistor 28 which has a predetermined voltage present thereon, is connected to the grid 30 to permit a normal current flow between the anode 26 and cathode 29. The second grid 31 of tube 19 is connected by conductor 33 to an adjustable point on the voltage divider 34 which is connected at one end to the mentioned outlet lead 23 and at its other end to the negative outlet lead 7. The cathode 29 is heated by a filament 37 which derives its heating current from a winding 4d of the transformer T. It will be noted that a bypass resistor 40 connects the conductor 15 to the conductor 23.

In the operation of the full wave section of the power supply, the rectifier tube 2 permits current to flow alternately between anodes 12, 13 and cathode 14. This current has a ripple component, which is partially smoothed out by the filter condenser 16. A portion of this partially filtered current flows unregulated through resistor 40 to conductor 23. The remainder of the partially filtered current is regulated in its flow through triode 18 to conductor 23, by a normal voltage on the triode grid 25. This normal voltage is developed from the drop across resistor 27 as a result of current flowing therethrough and through tetrode 19. It will be understood that this current flow is determined normally by voltage on grids 30 and 31 of the tetrode 19. The cathode 29 is connected to the anode 11b of the gaseous discharge tube 11. The cathode 11a of this latter tube is connected to conductor 7 to which the lower end of resistor 34 is also connected. The voltage across tube 11 is supplied from the half wave power supply and the action of the discharge tube 11, as described above, is such that conductor 8 is invariably at a fixed positive voltage relative to conductor 7. The grid bias on tube 19 is the difference in potential between conductor 8 which is connected to the cathode 29, and conductor 33 which is connected to an adjustable point on resistor 34. If the positive output voltage on conductor 23 tends to increase, for example, as it might do as a result of an increase in the commercial power supply voltage or a decrease in the current drain from the present power supply unit or due to the unfiltered component of ripple, the potential of grid 31 increases proportionately, while the potential of cathode 29 remains unchanged. Consequently, the grid 31 becomes more positive with respect to cathode 29 and the plate current of tube 19 increases. This increased current flows through resistor 27, causing a decrease in the voltage of grid 25 of tube 18 which is connected to the low potential end of resistor 27. The result of this change in voltage on grid 25 is that the plate resistance of tube 18 is increased, thus decreasing the voltage of cathode 22 and conductor 23 connected thereto. The net result is that the output voltage on conductor 23 remains practically unchanged. It will be understood that if the positive output voltage on conductor 23 tends to decrease, the arrangement will function in a similar manner but in the reverse sense to maintain this output voltage practically unchanged.

The present system was developed on the assumption that the current drain would never be less than some value I. Therefore, the by-pass resistor 40, previously referred to, has such characteristics that current up to the value I flows therethrough. By the use of this by-pass, it is possible to increase the maximum regulated current drain over that available from a conventional regulator circuit by the amount I. This means that currents from zero to I are not regulated, but this is of no consequence where the current drain always exceeds I.

It will thus be seen that this invention results in a reduction in the components of a power unit supplying both polarities while improving the operation thereof.

The present arrangement illustrates a preferred form of the invention but it will be understood that there can be many variations in this arrangement, such as the indiscriminate use of half wave and full wave rectifiers, without departing from the scope of this invention.

What I claim is:

1. In combination, a source of alternating current, a rectifier connected to said source and arranged to provide a negative voltage relative to a given voltage such as ground, means related to the output of said rectifier for maintaining the voltage output thereof at a substantially fixed reference potential, a second rectifier connected to said source and arranged to provide a positive voltage relative to said given voltage, and means comprising a variable impedance element connected in series in the output circuit of said second rectifier, said element being jointly controlled by the output of said second rectifier and by said reference potential for maintaining the voltage of the output of said second rectifier at substantially a predetermined value.

2. In combination, a source of alternating current, a rectifier connected to said source and arranged to provide a negative voltage relative to a given voltage such as ground, means related to the output of said rectifier for maintaining the voltage output thereof at a substantially fixed reference potential, a full wave rectifier connected to said source and arranged to provide a positive voltage relative to said given voltage, and means comprising an electron discharge device connected in series in the output circuit of said second rectifier, said device being jointly controlled by the output of said full wave rectifier and by said reference potential for maintaining the voltage of the output of said full wave rectifier at substantially a predetermined value.

3. In combination, a source of alternating current, a rectifier connected to said source and arranged to provide a negative voltage relative to a given voltage such as ground, means related to the output of said rectifier for maintaining the voltage output thereof at a substantially fixed reference potential, a second rectifier connected to said source and arranged to provide a positive voltage relative to said given voltage, controlling means for said second rectifier comprising an electron discharge device including an anode, a cathode and a grid, said anode and cathode being connected in series in the output circuit of said second rectifier, and means including a second electron discharge device for applying to said grid a difference in potential varying with respect to said reference potential inversely as the deviation from a given value of the power output of said second rectifier.

4. In combination, a source of alternating current, a first rectifier connected to said source, means including an arc discharge device provided with at least two electrodes and related to the output of said first rectifier for maintaining the voltage output thereof at a substanially fixed reference potential, a negative terminal and a common terminal respectively connected to said electrodes, a second rectifier connected to said source, said second rectifier being provided with an output circuit including a positive terminal and said common terminal, controlling means for said second rectifier comprising an electron discharge device including an anode, a cathode and a grid, said anode and cathode being connected in series in the output circuit of said second rectifier, and means including a second electron discharge device for applying to said grid a difference in potential varying with respect to said reference potential inversely as a deviation from a given value of the power output of said second rectifier.

5. In combination, a source of alternating current, a first rectifier connected to said source, said first rectifier having an output respectively connected to a negative terminal and to a common terminal, means related to the output of said first rectifier for maintaining the voltage output thereof at a substantially fixed reference potential, a second rectifier connected to said source, said second rectifier having an output circuit including a positive terminal and said common terminal, controlling means for said second rectifier comprising a first electron discharge device including an anode, a cathode and a grid, said anode and cathode being connected in series in the output circuit of said second rectifier whereby current flows through said first discharge device, a second electron discharge device comprising an anode electrode, a grid electrode, a screen electrode and a cathode electrode, said cathode electrode being maintained at said reference potential by a connection to the output of said first rectifier, an anode circuit including said anode electrode and said cathode electrode, means for applying to said screen electrode a voltage varying as a direct function of the current flow through said first electron discharge device, and means for applying to the grid of said first electron discharge device a voltage inversely proportional to the current flowing in said anode circuit.

6. In combination, a source of alternating current, a first rectifier connected to said source, means related to the output of said rectifier for maintaining the voltage output thereof at a substantially fixed reference potential, a second rectifier connected to said source, controlling means for said second rectifier comprising an electron discharge device including an anode, a cathode and a grid, said anode and cathode being connected in series in the output circuit of said second rectifier, means including an electron tube for applying to said grid a difference in potential varying with respect to said reference potential inversely as the deviation from a given value of the power output of said second rectifier, means including a resistor by-passing said anode and said cathode whereby a predetermined amount of unregulated power flows through said by-pass and regulated power flows through said discharge device, jointly to comprise the complete power output, and means for connecting together the positive terminal of said second rectifier and the negative terminal of said first rectifier whereby there is provided an output voltage which is negative with respect to the common terminal as well as an output voltage which is positive with respect to said common terminal.

7. In combination, a source of alternating current, a first rectifier connected to said source, means related to the output of said rectifier for maintaining the voltage output thereof at a substantially fixed reference potential, a first rectifier connected to said source, controlling means for said first rectifier comprising a first electron discharge device including an anode, a cathode and a grid, said anode and cathode being connected in series in the output circuit of said first rectifier whereby current flows through said triode, a second electron discharge device comprising an anode electrode, a grid electrode, a screen electrode and a cathode electrode, said cathode electrode being maintained at said reference potential by a connection to the output of said first rectifier, an anode circuit including said anode electrode and said cathode electrode, means for applying to said screen electrode a voltage varying as a direct function of the current flow through said first electron discharge device, means for applying to said grid of said first discharge device a voltage inversely proportional to the current flowing in said anode circuit, means including a resistor by-passing said anode and said cathode whereby a predetermined amount of unregulated power flows through said by-pass and regulated power flows through said first discharge device jointly to comprise the complete power output, and means for connecting together the positive terminal of said second rectifier and the negative terminal of said rectifier whereby there is provided an output voltage which is negative with respect to the common terminal as well as an output voltage which is positive with respect to said common terminal.

HAROLD GOLDBERG.

REFERENCES CITED

The following references are of record in the file of this patent:

UNITED STATES PATENTS

| Number | Name | Date |
| --- | --- | --- |
| 2,171,614 | Wendt | Sept. 5, 1939 |
| 2,195,121 | Mayer | Mar. 26, 1940 |
| 2,206,912 | Meyer et al. | July 9, 1940 |
| 2,268,790 | White et al. | Jan. 6, 1942 |
| 2,299,942 | Trevor | Oct. 27, 1942 |
| 2,323,857 | Trevor | July 6, 1943 |
| 2,337,911 | Mayer et al. | Dec. 28, 1942 |
| 2,356,269 | Potter | Aug. 22, 1944 |
| 2,377,500 | Johnson | June 5, 1942 |